(12) United States Patent
Loccufier et al.

(10) Patent No.: US 12,378,427 B2
(45) Date of Patent: *Aug. 5, 2025

(54) AQUEOUS RESIN BASED INKJET INK

(71) Applicant: AGFA NV, Mortsel (BE)

(72) Inventors: Johan Loccufier, Mortsel (BE); Jos Louwet, Mortsel (BE)

(73) Assignee: Agfa NV, Mortsel (BE)

( * ) Notice: Subject to any disclaimer, the term of this patent is extended or adjusted under 35 U.S.C. 154(b) by 380 days.

This patent is subject to a terminal disclaimer.

(21) Appl. No.: 17/922,818

(22) PCT Filed: Apr. 26, 2021

(86) PCT No.: PCT/EP2021/060775
§ 371 (c)(1),
(2) Date: Nov. 2, 2022

(87) PCT Pub. No.: WO2021/224037
PCT Pub. Date: Nov. 11, 2021

(65) Prior Publication Data
US 2023/0174804 A1 Jun. 8, 2023

(30) Foreign Application Priority Data
May 5, 2020 (EP) .................... 20172946

(51) Int. Cl.
C09D 11/322 (2014.01)
B41J 2/21 (2006.01)
(Continued)

(52) U.S. Cl.
CPC ........... *C09D 11/322* (2013.01); *B41J 2/2107* (2013.01); *B41J 11/002* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312;
(Continued)

(56) References Cited

U.S. PATENT DOCUMENTS

2005/0239920 A1  10/2005  Ono et al.
2012/0140008 A1* 6/2012  Ganapathiappan .... C09D 11/30
                                                      524/558
(Continued)

FOREIGN PATENT DOCUMENTS

EP  0293337 A2  11/1988
EP  2626390 A2  8/2013
(Continued)

OTHER PUBLICATIONS

European Patent Office, International Search Report in International Patent Application No. PCT/EP2021/060775, mailed Nov. 2, 2021, 6 pp.
(Continued)

*Primary Examiner* — Manish S Shah
(74) *Attorney, Agent, or Firm* — Leydig, Voit & Mayer, Ltd.

(57) ABSTRACT

An aqueous inkjet ink comprises a compound functionalized with at least two functional groups selected from the group consisting of a primary amine and a secondary amine, a colorant and a polymeric particle comprising an oligomer or polymer having at least 3 repeating units comprising a functional group according to general formula I, II or III general formula I general formula II general formula III general formula I
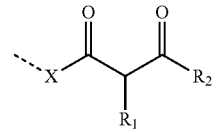

general formula II
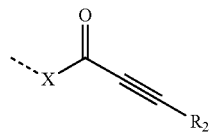

general formula III
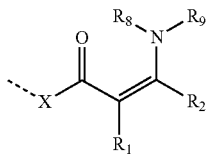

18 Claims, No Drawings

(51) Int. Cl.
| | |
|---|---|
| *B41J 11/00* | (2006.01) |
| *B41M 5/00* | (2006.01) |
| *C09D 11/033* | (2014.01) |
| *C09D 11/037* | (2014.01) |
| *C09D 11/10* | (2014.01) |
| *C09D 11/102* | (2014.01) |
| *C09D 11/54* | (2014.01) |
| *C09D 149/00* | (2006.01) |

(52) U.S. Cl.
CPC ......... *B41M 5/0017* (2013.01); *C09D 11/033* (2013.01); *C09D 11/037* (2013.01); *C09D 11/10* (2013.01); *C09D 11/102* (2013.01); *C09D 11/54* (2013.01); *C09D 149/00* (2013.01)

(58) Field of Classification Search
CPC .............. B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 2013/0209695 | A1 | 8/2013 | Fukagawa |
| 2013/0258017 | A1* | 10/2013 | Kagose ................ B41J 11/0015 |
| | | | 522/174 |
| 2018/0094154 | A1* | 4/2018 | Loccufier ................ B01J 13/16 |
| 2019/0249024 | A1 | 8/2019 | Shinohara et al. |
| 2019/0367762 | A1* | 12/2019 | Loccufier ............ B41M 5/0017 |

FOREIGN PATENT DOCUMENTS

| | | |
|---|---|---|
| JP | 2013-502481 A | 1/2013 |
| JP | 2013-163794 A | 8/2013 |
| JP | 2020-509148 A | 3/2020 |
| WO | WO 2011/022001 A1 | 2/2011 |
| WO | WO 2013/001313 A1 | 1/2013 |
| WO | WO 2015/158654 A1 | 10/2015 |
| WO | WO 2018/077624 A1 | 5/2018 |
| WO | WO 2018/138054 A1 | 8/2018 |

OTHER PUBLICATIONS

European Patent Office, Written Opinion in International Patent Application No. PCT/EP2021/060775, mailed Nov. 2, 2021, 11 pp.
U.S. Appl. No. 17/922,625, filed Nov. 1, 2022.
U.S. Appl. No. 17/922,628, filed Nov. 1, 2022.
U.S. Appl. No. 17/922,820, filed Nov. 2, 2022.
U.S. Appl. No. 17/923,024, filed Nov. 3, 2022.

* cited by examiner

AQUEOUS RESIN BASED INKJET INK

CROSS-REFERENCE TO RELATED APPLICATIONS

This patent application is the U.S. national phase of copending International Patent Application No. PCT/EP2021/060775, filed Apr. 26, 2021, which claims the benefit of European Patent Application No. 20172946.4, filed May 5, 2020.

TECHNICAL FIELD

The present invention relates to an aqueous inkjet ink comprising a resin particle comprising an oligomer or polymer and a compound functionalized with at least two functional groups being a primary amine or a secondary amine for use in inkjet printing on non-absorbing substrates.

BACKGROUND ART

The industrial applications of ink jet are expanding into more and more fields of technology, having to meet ever more demanding physical properties. Industrial printing technology has to be compatible with a broad scope of non-absorbing substrates such as glass and metals but also synthetic resins, including temperature sensitive resins such as polyolefines.

Chemical resistance against aggressive solvents is one of the demands images have to fulfil in heavy duty applications. Until now, ink jet technology in heavy duty applications has been UV based. However, aqueous technology is gradually gaining ground also in the more demanding applications.

In order to meet the demands in industrial inkjet applications, aqueous resin based inks have been designed, based on different technologies. Latex based technologies, as disclosed in WO2018077624A, are compatible with temperature sensitive substrates based on tuning the film forming temperature of the latex. However, their adhesion performance is not always optimal and especially their chemical resistance is limited. Moreover, latex based inks show the tendency of film formation at the nozzle of the inkjet head, leading to inkjet reliability problems.

Encapsulation based technologies as disclosed in WO2015158654A and EP293337A, avoid film formation at the nozzle of the inkjet head, but often require a high activation temperature, making the technology not suited for printing on temperature sensitive substrates such as polyolefines. In order to tackle the problem of chemical resistance in combination with compatibility with temperature sensitive substrates, several approaches based on water based UV technologies have been disclosed. These approaches require both drying and curing, making printer design complex.

In US20190249024, a dual ink approach is disclosed wherein a first ink comprises an epoxy compound and a second ink comprises a primary amine based polymer. The combination is claimed to result in good adhesion properties and alcohol resistance. However, it is known that epoxy compounds are prone to hydrolysis, holding the risk of losing activity upon storage of the aqueous based ink. The requirement of separating both reactive compounds in separate printing liquids makes the inkjet recording method and the printing equipment much more complex with respect to an all-in-one liquid approach.

Therefore, there is still a need for aqueous resin based technologies, showing reliable ink jetting behaviour, compatible with temperature sensitive substrates, yielding excellent physical properties such as chemical resistance upon drying, not holding the risk of hydrolysis upon storage and not requiring two separate printing liquids.

SUMMARY OF INVENTION

It is the objective of the present invention to provide a solution to the above stated problems. The objective has been achieved by providing an inkjet ink comprising a compound functionalized with at least two functional groups being a primary or secondary amine and a dispersion of particles as defined in claim 1.

It is another embodiment of the invention to provide a printing method using the inkjet inks of claim 1 as defined in claim 10.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Aqueous Inkjet Ink According to the Invention

The aqueous inkjet ink according to the invention, comprises a compound functionalized with at least two functional groups selected from the group consisting of a primary amine and a secondary amine, a colorant and a polymeric particle comprising an oligomer or polymer having at least 3 repeating units comprising a functional group according to general formula I, II or III (see below). Without being bound by any theory, it is thought that a crosslinking reaction takes place between the particles containing an oligomer or polymer having at least 3 repeating units comprising a functional group according to general formula I, II or III and the compound functionalized with at least two functional groups being a primary amine or a secondary amine. This crosslinking of the oligomer or polymer leads to an improvement of solvent resistance of the jetted image.

A.1. Polymeric Particle Comprising an Oligomer or Polymer Having at Least 3 Repeating Units Comprising a Functional Group According to General Formula I, II or III The objectives of the present invention are realized by a polymeric particle comprising an oligomer or polymer having at least 3 repeating units comprising a functional group according to general formula I, II or III

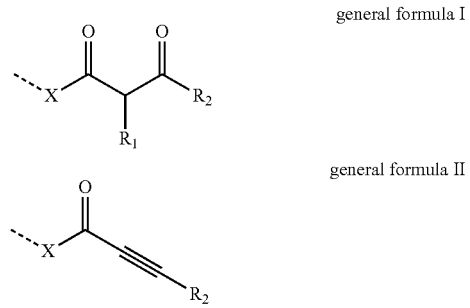

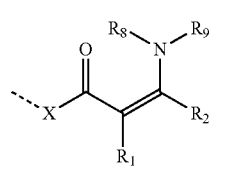

general formula III wherein
- $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $COR_3$ and CN
- $R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group and $COR_3$
- $R_1$ and $R_2$ may represent the necessary atoms to form a five to eight membered ring
- $R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$ and $NR_5R_6$
- $R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group
- $R_5$ and $R_6$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group
- $R_5$ and $R_6$ may represent the necessary atoms to form a five to eight membered ring
- X is selected from the group consisting of O and $NR_7$
- $R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group
- $R_8$ and $R_9$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group
- $R_8$ and $R_9$ may represent the necessary atoms to form a five to eight membered ring.

In a preferred embodiment said oligomer or polymer comprising repeating units functionalized with a moiety according to general formula I, comprise at least 7 functionalized, more preferably at least 10 and most preferably at least 15 functionalized repeating units.

The oligomer or polymer according to the present invention preferably has a weight average molecular weight of at least 2000, more preferably 4000 and most preferably between 6000 and 30000.

The polymer according to the present invention can be a homopolymer or a copolymer of different repeating units.

Oligomers or polymers according to the present invention can be prepared by addition polymerization of ethylenically unsaturated monomers, polycondensation and ring opening polymerization, addition polymerization being particularly preferred. In the most preferred embodiment, free radical polymerization of ethylenically unsaturated monomers is used to prepare the resins according to the present invention. In another embodiment of the present invention, the molecular weight of the resins according to the present invention is controlled using RAFT agents, ATRP, nitroxyl radical technology or transfer agents, preferably thiols.

In a further preferred embodiment, X represents an oxygen. In an even further preferred embodiment, $R_1$ represents a hydrogen. In an even further preferred embodiment $R_2$ represent a substituted or unsubstituted alkyl group, unsubstituted being more preferred, a lower alkyl group being even more preferred and a methyl group being the most preferred.

Typical monomers for the preparation of resins according to the present invention are given below without being limited thereto. Monomers for addition polymerization: See Table 1

TABLE 1

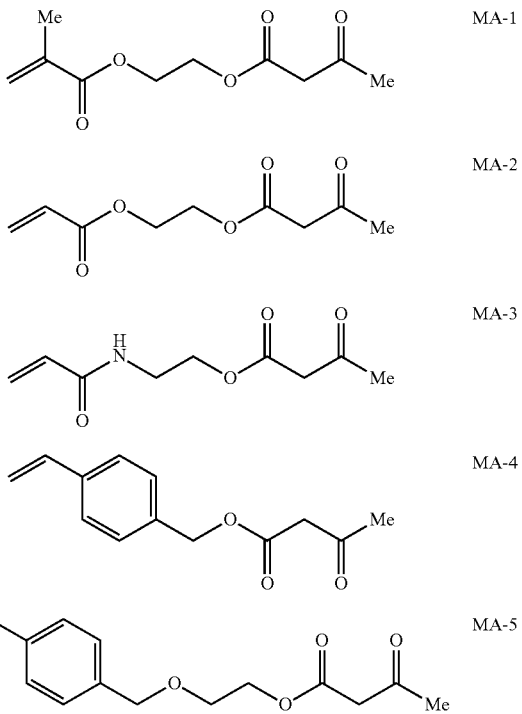

TABLE 1-continued

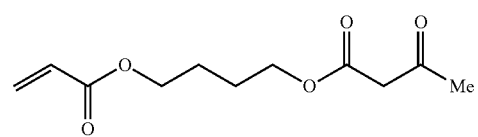 [SMILES: C=CC(=O)OCCCCOC(=O)CC(C)=O] MA-6

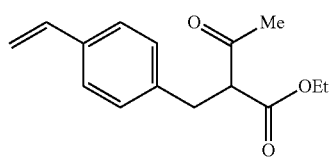 [SMILES: C=Cc1ccc(CC(C(C)=O)C(=O)OCC)cc1] MA-7

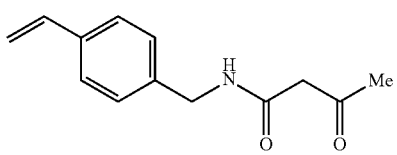 [SMILES: C=Cc1ccc(CNC(=O)CC(C)=O)cc1] MA-8

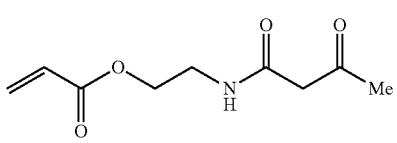 MA-9

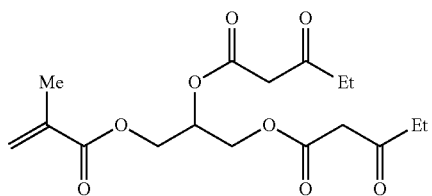 [SMILES: C=C(C)C(=O)OCC(COC(=O)CC(=O)CC)OC(=O)CC(=O)CC] MA-10

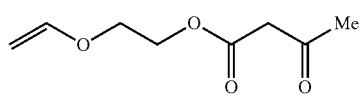 MA-11

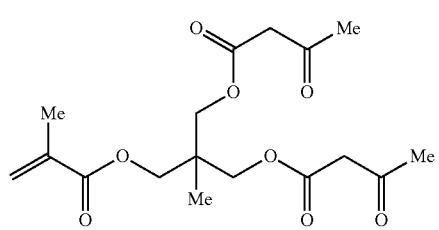 [SMILES: C=C(C)C(=O)OCC(C)(COC(=O)CC(C)=O)COC(=O)CC(C)=O] MA-12

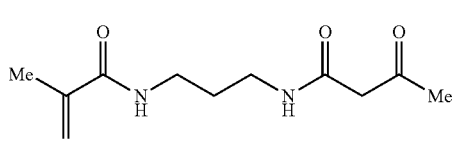 [SMILES: C=C(C)C(=O)NCCCNC(=O)CC(C)=O] MA-13

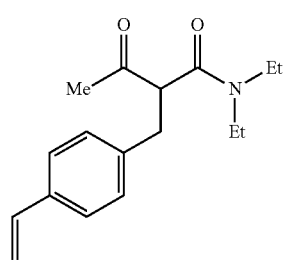 [SMILES: C=Cc1ccc(CC(C(C)=O)C(=O)N(CC)CC)cc1] MA-14

TABLE 1-continued

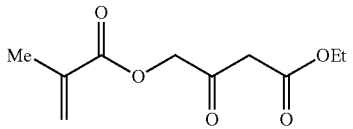 MA-15

Free radical and cationic polymerization conditions are preferred to prepare addition polymers according to the present invention.

Monomers for ring opening polymerization: see Table 2

TABLE 2

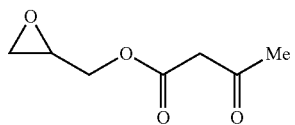 [SMILES: CC(=O)CC(=O)OCC1CO1] MR-1

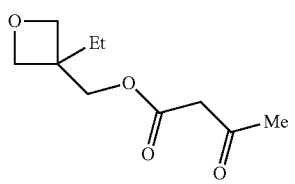 [SMILES: CCC1(COC(=O)CC(C)=O)COC1] MR-2

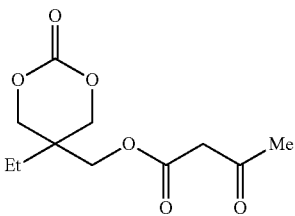 [SMILES: CCC1(COC(=O)CC(C)=O)COC(=O)OC1] MR-3

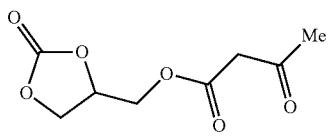 [SMILES: CC(=O)CC(=O)OCC1COC(=O)O1] MR-4

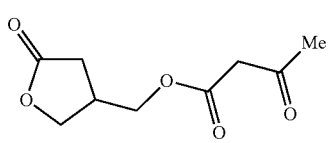 [SMILES: CC(=O)CC(=O)OCC1COC(=O)C1] MR-5

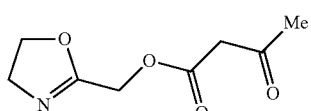 MR-6

Poly(ethers), poly(esters), poly(carbonates) and poly(amides) or copolymers thereof can be prepared using ring opening polymerization circumstances documented in the scientific literature.

Monomers for polycondensation: see Table 3

TABLE 3

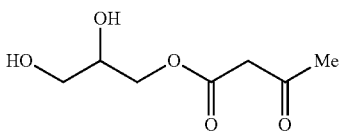 [SMILES: CC(=O)CC(=O)OCC(O)CO] MP-1

TABLE 3-continued

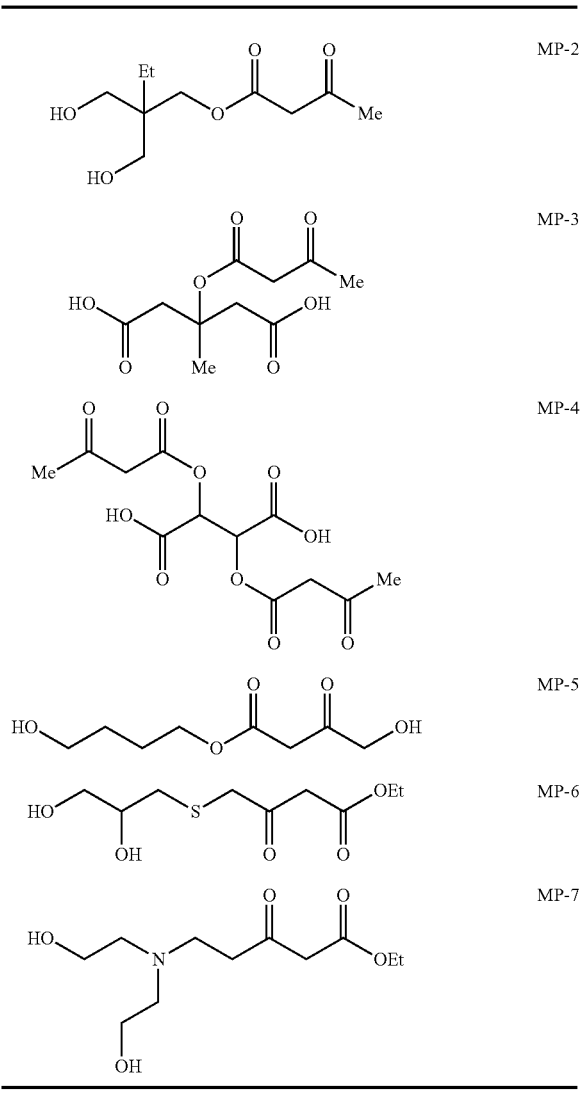

Poly(esters) can be prepared by condensation of functionalized diols with di-acids or di-acid chlorides under conditions known to those skilled in the art. Functionalized di-acids can be converted into poly(esters) by condensation with diol. Poly(urethanes) can be prepared by condensation of functionalized diols with di-isocyanates under conditions known to those skilled in the art.

The particles comprising an oligomer or polymer having at least 3 repeating units comprising a functional group according to general formula I, II or III, are preferably dispersed in the aqueous vehicle of the inkjet ink. The particles are dispersed in the aqueous medium of the inkjet ink preferably by using dispersants or surfactants.

The particles to be used in a jettable aqueous formulation such as an inkjet ink, jettable pre-treatment liquid or jettable overcoat formulation (over-print varnish), have an average particle size of no more than 4 µm as determined by dynamic laser diffraction. The nozzle diameter of inkjet print heads is usually 20 to 35 µm. Hence preferably, the average particle size is from 0.05 to 2 µm, more preferably from 0.10 to 1 µm. When the average particle size of the particle is smaller than 2 µm, excellent resolution and dispersion stability with time are obtained.

The particles are preferably present in an aqueous inkjet ink, but can also be present in a pre-treatment liquid (or primer) or an over-print varnish. The amount of particles in the inkjet ink is of no more than 45 wt. %, preferably between 5 and 25 wt. % based on the total weight of the liquid/varnish/ink. It was observed that above 30 wt. % jetting was not always so reliable.

In a preferred embodiment, the oligomer or polymer according to the present invention is encapsulated to form an aqueous dispersion, preferably by polymerization, more preferably by using interfacial polymerization. Encapsulation increases the storage stability of the aqueous inkjet due to the formation of a polymeric barrier, i.e. the polymeric shell of the capsule, between the oligomer or polymer and the compound functionalized with at least two functional groups selected from the group consisting of a primary amine and a secondary amine.

More particularly, partial hydrolysis of the functional group according to general formula I upon storage of the aqueous inkjet ink is prevented. The reactivity and hence the obtained improvements towards solvent and water resistance of the printed images does hence not decrease upon storage of the inkjet ink.

It has also been observed that the encapsulation of the oligomer or polymer having at least 3 repeating units comprising the functional group according to general formula I, II or III results in a more reliable jetting behaviour of the inkjet ink comprising the resin than without encapsulation.

The capsules are preferably present in an inkjet ink, but can also be present in a pre-treatment liquid (or primer) or an over-print varnish. Preferably the capsules can be in amount of no more than 45 wt. %, preferably between 5 and 25 wt. % based on the total weight of the liquid/varnish/ink. It was observed that above 30 wt. % jetting was not always so reliable.

The capsules to be used in a jettable aqueous formulation such as an inkjet ink, jettable pre-treatment liquid or jettable over-print varnish have an average particle size of no more than 4 µm as determined by dynamic laser diffraction for the same reason as explained above. Hence preferably, the average particle size is from 0.05 to 2 µm, more preferably from 0.10 to 1 µm. When the average particle size of the capsule is smaller than 2 µm, excellent resolution and dispersion stability with time are obtained.

The capsules are dispersed in the aqueous medium of the inkjet ink using a dispersing group covalently bonded to the polymeric shell or are dispersed by using dispersants or surfactants preferably added during or after the formation of the capsule. The dispersing group covalently bonded to the polymeric shell is preferably selected from the group consisting of a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability of the inkjet ink is accomplished solely by electrostatic stabilization. For example, a slightly alkaline aqueous medium will turn the carboxylic acid groups covalently bonded polymeric shell into ionic groups, whereafter the negatively charged capsules have no tendency to agglomerate. If sufficient dispersing groups are covalently bonded to the polymeric shell, the capsule becomes a so-called self-dispersing capsule.

These negatively or positively charged capsule surfaces can also be advantageously used during inkjet printing. For example, a second liquid such as a pre-treatment liquid containing cationic dispersed capsules can be used to precipitate anionic stabilized colorants of the aqueous inkjet ink printed on top of the second liquid. By using this method an improvement in image quality can be observed due to the immobilisation of the colorants.

There is no real limitation on the type of polymer used for the polymeric shell of the capsule. Preferably, the polymer used in the polymeric shell is preferably cross-linked. By crosslinking, more rigidity is built into the capsules allowing a broader range of temperatures and pressures for handling the capsules in both the ink making and in the inkjet printer.

Preferred examples of the polymeric shell material include polyureas, polyesters, polycarbonates, polyamides, melamine based polymers and mixtures thereof, with polyureas being especially preferred.

A.2. Preparation of the Capsule According to the Invention

The encapsulation of the oligomer or polymer, having at least 3 repeating units comprising a functional group according to general formula I, II or III with a polymeric shell, can be prepared using both chemical and physical methods. Suitable encapsulation methodologies include complex co-acervation, liposome formation, spray drying and polymerization methods.

In the present invention preferably a polymerization method is used, as it allows the highest control in designing the capsules. More preferably interfacial polymerization is used to prepare the capsules of the invention. This technique is well-known and has been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules according to the present invention are preferably prepared from an oleophilic dispersion in an aqueous continuous phase.

Typical polymeric shells of the capsules according to the invention and formed by interfacial polymerisation are selected from the group consisting of polyamides, typically prepared from di- or poly-acid chlorides as first shell component and di- or oligoamines as second shell component, polyurea, typically prepared from di- or oligoisocyanates as first shell component and di- or oligoamines as second shell component, polyurethanes, typically prepared from di- or oligoisocyanates as first shell component and di- or oligoalcohols as second shell component, polysulfonamides, typically prepared from di- or oligosulfochlorides as first shell component and di- or oligoamines as second shell component, polyesters, typically prepared from di- or oligo-acid chlorides as first shell component and di- or oligoalcohols as second shell component and polycarbonates, typically prepared from di- or oligo-chloroformates as first shell component and di- or oligoalcohols as second shell component. The shell can be composed of combinations of these polymers.

In a further embodiment, polymers, such as gelatine, chitosan, albumin and polyethylene imine can be used as second shell components in combination with a di- or oligo-isocyanate, a di- or oligo acid chloride, a di- or oligo-chloroformate and an epoxy resin as first shell component.

In a particularly preferred embodiment, the shell is composed of a polyurea or a combination thereof with a polyurethane. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

A water immiscible solvent is an organic solvent having low miscibility in water. Low miscibility is defined as any water solvent combination forming a two phase system at 20° C. when mixed in a one over one volume ratio.

The core contains the oligomer or polymer having at least 3 repeating units comprising a functional group according to general formula I, II or III. These are usually incorporated into the capsules by dissolving it in the organic solvent having low miscibility with water and having a lower boiling point than water. A preferred organic solvent is ethyl acetate, because it also has a low flammability hazard compared to other organic solvents.

However, in some cases the organic solvent may be omitted. For example, the organic solvent can be omitted when the oligomer or polymer, having at least 3 repeating units comprising a functional group according to general formula I, II or III have a viscosity of less than 100 mPa·s.

The method for preparing a dispersion of capsules preferably includes the following steps:

a) preparing a non-aqueous solution of a first shell component for forming the polymeric shell and the oligomer or polymer, having at least 3 repeating units comprising a functional group according to general formula I, II or III in an organic solvent having a low miscibility with water and having a lower boiling point than water;

b) preparing an aqueous solution of a second shell component for forming the polymeric shell;

c) dispersing the non-aqueous solution under high shear in the aqueous solution;

d) optionally stripping the organic solvent from the mixture of the aqueous solution and the non-aqueous solution; and e) preparing a polymeric shell around the oligomer or polymer, having at least 3 repeating units comprising a functional group according to general formula I, II or III by interfacial polymerization of the first and second shell component for forming the polymeric shell.

The capsule dispersion can then be completed into an inkjet ink, an aqueous pre-treatment liquid or any liquid suitable in a printing process by addition of e.g. colorant, water, humectants, surfactant and the like.

In a preferred embodiment, the capsules are self-dispersing capsules. In order to make capsules self-dispersing, anionic dispersing groups, such as carboxylic acids or salts thereof, sulfonic acids or salts thereof, phosphoric acid esters or a salts thereof or a phosphonic acids or salts thereof, or cationic dispersing groups, such as quaternary ammonium salts, protonated amines, protonated nitrogen containing heteroaromatic compounds, quaternized tertiary amines, N-quaternized heteroaromatic compounds, sulfoniums and phosphoniums may be covalently bonded to the polymeric shell of the capsule to guarantee the dispersion stability.

A preferred strategy to incorporate anionic stabilizing groups into the polymeric shell of a capsule makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphonic acid or salt thereof can be used.

Several amphoteric surfactants, being mixtures of surfactants partially having secondary amines but also comprising tertiary amines are commercially available. Prohibitive foam formation in ink jet inks based on capsules made by using the commercially available amphoteric surfactants was encountered in an inkjet printer. Foaming caused problems in the ink supply and also in the degassing for trying to remove air from the ink, thus leading to unreliable jetting. Therefore, surfactants according to Formula (I) of WO2016/165970 are preferably used during the encapsulation process of the oligomer or polymer, having at least 3 repeating units comprising a functional group according to general formula I, II or III.

Incorporating cationic dispersing groups into the polymeric shell of a capsule for use in a pre-treatment liquid or cationic based inkjet ink (as disclosed in the patent application WO2019/105867), makes use of bonding a surfactant with a cationic dispersing group to the shell of the capsules according to the present invention. This is done by reaction of a surfactant comprising at least one primary or secondary amine group and at least a group selected from protonated amine, a protonated nitrogen containing heteroaromatic compound, a quaternized tertiary amine, a N-quaternized heteroaromatic compound, a sulfonium and a phosphonium with a first schell component, preferably an isocyanate monomer of the shell. In an even more preferred embodiment said surfactant is a surfactant according to Formula IV.

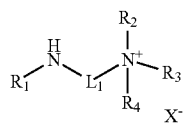

wherein
- $R_1$ is selected from the group consisting of a substituted or unsubstituted alkyl group, a substituted or unsubstituted alkenyl group and a substituted or unsubstituted alkynyl group with the proviso that $R_1$ comprises at least eight carbon atoms;
- $R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group
- $L_1$ represents a divalent linking group comprising no more than eight carbon atoms;
- X represents a counterion to compensate the positive charge of the ammonium group.

The capsules according to the invention are dispersed into an aqueous medium. The aqueous medium consists of water, but may preferably include one or more water-soluble organic solvents.

The one or more organic solvents may be added for a variety of reasons. For example, it can be advantageous to add a small amount of an organic solvent to improve the dissolution of a compound in the pre-treatment liquid or inkjet ink to be prepared, or to improve ink penetrability into porous substrates or to decrease the drying rate of ink at the nozzle of the inkjet head. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

A.3. Compound Functionalized with at Least Two Amine Groups

The ink according to the present invention further comprises at least one compound functionalized with at least to functional groups selected from the group consisting of a primary amine and a secondary amine, a primary amine being more preferred.

In a more preferred embodiment, said amino functionalized compound has a functionality of 2 to 8, more preferably 2 to 5 and most preferably is di- or trifunctional. The lower the functionality, the lower the risk of coagulation with the polymeric particle. Di- or trifunctional compounds are more available on the market than the compounds with a higher functionality.

Typical amine functionalized ink additives are given in Table 4 without being limited thereto.

TABLE 4

| | |
|---|---|
| 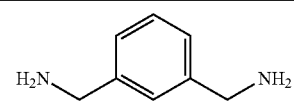 | AM-1 |
| 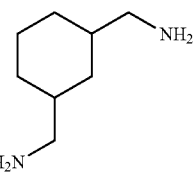 | AM-2 |
| 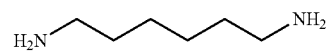 | AM-3 |

TABLE 4-continued

| | |
|---|---|
| 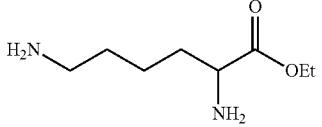 [SMILES: CCOC(=O)C(N)CCCCN] | AM-4 |
| 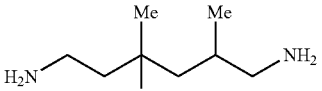 | AM-5 |
| 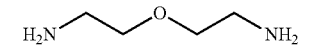 | AM-6 |
| 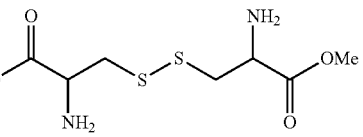 | AM-7 |
| 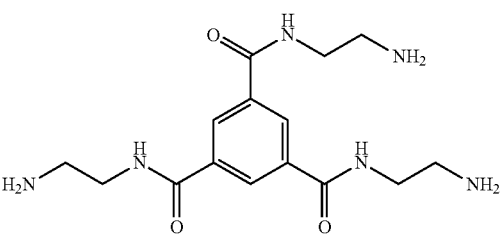 [SMILES: NCCNC(=O)c1cc(C(=O)NCCN)cc(C(=O)NCCN)c1] | AM-8 |
| 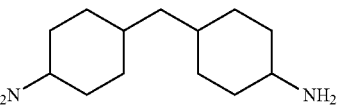 | AM-9 |

In a preferred embodiment, the aqueous inkjet ink or a jettable pre-treatment liquid comprises at least one resin particle, functionalized with at least 5, more preferably at least 10 and most preferably at least 15 functional groups selected from the group consisting of a primary amine and a secondary amine, a primary amine being more preferred.

The polymer can be dissolved in the aqueous inkjet ink or can be present as a dispersed or emulsified polymer particle. Typical polymers, useful in the design of the fluid as a primer, are selected from the group consisting of poly (allylamine), poly(vinylamine), poly(vinylamine-co-vinyl-formamide), chitosan, homo- or copolymers of 4-aminom-ethyl-styrene or salt thereof, 2-aminoethyl-acrylate or salt thereof, 2-aminoethyl-methacrylate or salt thereof, 3-aminopropyl-acrylamide or salt thereof, 3-aminopropyl-methacrylamide or salt thereof, poly(lysine) or copolymers thereof and the like.

In a preferred embodiment, the aqueous inkjet ink comprises at least one resin particle, functionalized with at least 5, more preferably at least 10 and most preferably at least 15 functional groups selected from the group consisting of a primary amine and a secondary amine, a primary amine being more preferred. The use of a functionalized resin particle instead of a functionalized compound in an aqueous inkjet ink has the advantage of an improved rheological behaviour leading to an improved jetting reliability and colloidal stability of the inkjet ink.

The amino functionalized resin particle can be prepared by derivatisation of amino functionalized polymers, followed by dispersing of said derivative in an aqueous environment, optionally followed by crosslinking of the particle. Preferred starting polymers are homo- or co-polymers of vinyl amine or allylamine. Typical examples include poly (allylamine), poly(vinylamine), poly(vinylamine-co-vinyl-formamide), chitosan, homo- or copolymers of 4-aminom-ethyl-styrene or salt thereof, 2-aminoethyl-acrylate or salt thereof, 2-aminoethyl-methacrylate or salt thereof, 3-aminopropyl-acrylamide or salt thereof, 3-aminopropyl-methacrylamide or salt thereof, poly(lysine) or copolymers thereof and the like. The weight average molecular weight of the starting polymers is preferably at least 7000, more preferably at least 15000 and most preferably at least 25000.

Other synthetic strategies include derivatisation of carboxylic acid functionalized acrylic polymers with azeridine followed by emulsification and optionally crosslinking, emulsion or mini-emulsion polymerization of optionally protected amino functionalized monomers, optionally followed by deprotection, post derivatisation of reactive latexes, comprising reactive monomers such as 4-chlorom-ethyl-styrene and sol gel based polycondensations based on amino functionalized alkoxysilanes.

In a preferred embodiment, said amino functionalized resin particles are crosslinked. In a further preferred embodiment at least 5 mol %, more preferably at least 10 mol % and most preferably at least 20 mol % of the repeating units in the polymer resin particle are functionalized with a functional groups selected from the group consisting of a primary amine and a secondary amine.

The amines can be at least partially neutralized with an acid such as hydrochloric acid, methane sulfonic acid, p.-toluene sulfonic acid, phosphoric acid, sulfuric acid and carboxylic acids such as acetic acid, citric acid and lactic acid.

A.4. Colorants

The colorants in the aqueous inkjet ink according to the invention can be dyes such as dispersed dyes, acid dyes, reactive dyes and can be pigments, or a combination thereof. Preferably, the colorant in the inkjet ink according to the invention is a pigment.

The pigments of the ink may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548.

The pigment particles are dispersed in an aqueous medium by means of a polymeric dispersant or a surfactant. Self-dispersible pigments may also be used. If combined with the particles or capsules according to the invention and having anionic dispersing groups, anionic surfactants may be preferably used as dispersant for the pigment. If combined with particles and capsules according to the invention having cationic dispersing groups, cationic surfactants may be preferably used as dispersant for the pigment. The latter prevents interaction of the polymeric dispersant with the dispersing groups of the particles or capsules included in the inkjet ink, since dispersion stability of the pigment is accomplished by the same technique of electrostatic stabilization as employed for the capsules.

A self-dispersible pigment is a pigment having on its surface covalently bonded anionic hydrophilic groups, such as salt-forming groups or the same groups used as dispersing groups for the capsules, that allow the pigment to be dispersed in an aqueous medium without using a surfactant or a resin. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer BI90plus based upon the principle of dynamic light scattering. The ink is diluted with water to a pigment concentration of 0.002 wt %. The measurement settings of the BI90plus are: 5 runs at 23° C., angle of 90°, wavelength of 635 nm and graphics=correction function.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:
  statistically polymerized monomers (e.g. monomers A and B polymerized into ABBAABAB);
  alternating polymerized monomers (e.g. monomers A and B polymerized into ABABABAB);
  gradient (tapered) polymerized monomers (e.g. monomers A and B polymerized into AAABAABBABBB);
  block copolymers (e.g. monomers A and B polymerized into AAAAABBBBBB) wherein the block length of each of the blocks (2, 3, 4, 5 or even more) is important for the dispersion capability of the polymeric dispersant;
  graft copolymers (graft copolymers consist of a polymeric backbone with polymeric side chains attached to the backbone); and
  mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from Lubrisol. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

A.5. Additives

The aqueous inkjet ink according to the invention contains water, but may include one or more water-soluble organic solvents. Suitable organic solvents are described in § A.2

The aqueous inkjet ink according to the invention may also contain humectants. Humectants prevent the clogging of nozzles. The prevention is due to its ability to slow down the evaporation rate of the inkjet ink, especially the water in the ink. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the inkjet ink in an amount of 0.1 to 20 wt. % based on the total weight of the liquid.

The aqueous inkjet ink according to the invention may contain a surfactant. Any known surfactant may be used but preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2, 4, 7,9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1010, or from Nissin Chemical Industry as Surfynol (registered trademark) 465 and Surfynol 61.

The ink jet ink composition according to the invention may further comprise an extra resin. This resin is often added to the ink jet ink formulation to further achieve a good adhesion of the pigment to the substrate. The resin is a polymer and suitable resins can be acrylic based resins, a urethane-modified polyester resin or a polyethylene wax.

The polyurethane resin may be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin which may be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the unpublished patent application EP16196224.6.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim Calif.); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the ink jet ink according to the invention is at least 1 (wt.)% and preferably lower than 30 (wt.)%, more preferably lower than 20 (wt.)%.

In a preferred embodiment, the inkjet ink according to the invention is part of an inkjet ink set, more preferably part of a multi-colour inkjet ink set including a plurality of inkjet inks according to the invention. The inkjet ink set preferably includes at least a cyan inkjet ink, a magenta inkjet ink, a yellow inkjet ink and a black inkjet ink. Such a CMYK-inkjet ink set may also be extended with extra inks such as red, green, blue, violet and/or orange to further enlarge the colour gamut of the image. The inkjet ink set may also be extended by the combination of the full density inkjet inks with light density inkjet inks. The combination of dark and light colour inks and/or black and grey inks improves the image quality by a lowered graininess.

In a preferred embodiment, the inkjet ink set also includes a white inkjet ink. This allows obtaining more brilliant colours, especially on transparent substrates, where the white inkjet ink can be applied either as a primer or on top of the colour inkjet inks when the image is viewed through the transparent substrate.

The viscosity of the inkjet ink according to the invention is preferably smaller than 25 mPa·s at 25° C. and at a shear rate of 90 s$^{-1}$, more preferably between 2 and 15 mPa·s at 25° C. and at a shear rate of 90 s$^{-1}$.

The surface tension of the inkjet ink according to the invention is preferably in the range of about 18 mN/m to about 70 mN/m at 25° C., more preferably in the range of about 20 mN/m to about 40 mN/m at 25° C.

B. Inkjet Printing Method

In a preferred inkjet recording method, the method comprises the steps of: a) jetting the aqueous inkjet ink according to the invention on a substrate, preferably a non-porous substrate, the ink comprising a colorant, a compound functionalized with at least two functional groups being a primary amine or a secondary amine, a primary amine being more preferred, a dispersion of particles containing an oligomer or polymer having at least 3 repeating units comprising a functional group according to general formula I, II or III, more preferably the ink comprising a dispersion of capsules composed of a polymeric shell surrounding a core, the core containing an oligomer or polymer having at least 3 repeating units comprising a functional group according to general formula I, II or III; and b) drying the jetted inkjet ink by applying heat such as to obtain a temperature of the jetted ink of at least 60° C., more preferably at least 80° C. If the obtained temperature is below 60° C., no or insufficient crosslinking reaction occurs between the particles containing an oligomer or polymer having at least 3 repeating units comprising a functional group according to general formula I, II or III and the compound functionalized with at least two functional groups being a primary amine or a secondary amine. Consequently, no improvement of solvent resistance of the jetted and dried ink is occurring.

In another preferred inkjet recording method, the method comprises the steps of: a) applying an aqueous pre-treatment liquid on a substrate, preferably a non-porous substrate, b) jetting the aqueous inkjet ink according to the invention on a substrate, preferably a non-porous substrate, the ink comprising a colorant, a compound functionalized with at least two functional groups being a primary amine or a secondary amine, a primary amine being more preferred, the dispersion of particles containing an oligomer or polymer having at least 3 repeating units comprising a functional group according to general formula I, II or III, more preferably the ink comprising a dispersion of capsules composed of a polymeric shell surrounding a core, the core containing an oligomer or polymer having at least 3 repeating units comprising a functional group according to general formula I, II or III; and c) drying the jetted inkjet ink by applying heat such as to obtain a temperature of the jetted ink of at least 60° C., more preferably at least 80° C.

The pre-treatment liquid preferably comprises a compound capable of aggregating components in the aqueous inkjet ink such as a flocculant such as an organic acid, a resin, a multivalent metal ion or a cationic surfactant. Suitable examples of multivalent metal ions are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating the colorant, more specifically the pigment, by acting on the carboxyl groups on the surface of the pigment in the ink jet ink, or on the dispersed polymer of capsules contained in the ink. As a result, the colorants of the ink are fixed resulting in a decreased color bleeding and beading. Therefore, it is preferred that the surface of the pigment in the ink and/or the dispersed polymer of the capsules, if contained in the ink, have an anionic group, preferably a carboxyl group.

Preferred examples of the organic acids include, but are not limited to, acetic acid, propionic acid, and lactic acid.

Preferred examples of the resin include, but are not limited to, starches; cellulosic materials such as carboxymethyl cellulose and hydroxymethyl cellulose; polyurethanes, polysaccharide; proteins such as gelatine and casein; water-soluble naturally occurring polymers such as tannin and lignin; and synthetic water-soluble polymers such as polymers comprising polyvinyl alcohol, polymers comprising polyethylene oxide, polymers formed from acrylic acid monomers, and polymers formed from maleic anhydride monomers. Other suitable resins are acrylic polymers as described in EP2362014 [0027-0030]. Preferably the resin is a cationic resin, more preferably a cationic charged polyurethane. The resin content is preferably not more than 20 wt. % relative to the total mass of the pre-treatment liquid (100 mass %).

Aqueous pre-treatment liquids may also comprise the compound functionalized with at least two functional groups being a primary amine or a secondary amine, a primary amine being more preferred the dispersion of particles comprising an oligomer or polymer having at least 3 repeating units comprising a functional group according to general formula I, II or III or capsules composed of a polymeric shell surrounding a core. The core contains an oligomer or polymer having at least 3 repeating units comprising a functional group according to general formula I, II or III. The shell further comprises a dispersing group, preferably covalently bonded to the shell, more preferably, the dispersing group is a group selected from the group of a protonated amine, a protonated nitrogen containing heteroaromatic compound, a quaternized tertiary amine, a N-quaternized heteroaromatic compound, a sulfonium and a phosphonium. The pre-treatment liquid may also further a comprise compound functionalized with at least two functional groups being a primary amine or a secondary amine, a primary amine being more preferred.

In a more preferred embodiment, said amino functionalized compound has a functionality of 2 to 8, more preferably 2 to 5 and most preferably is di- or trifunctional.

The aqueous medium of the pretreatment liquid contains water, but may include one or more water-soluble organic solvents. Suitable organic solvents are described in § A.2. If present in the pre-treatment liquid, the capsules are then preferably in an amount of no more than 45 wt. %, more preferably between 5 and 25 wt. % based on the total weight of the pre-treatment liquid.

The pre-treatment liquid may also contain humectants. Humectants are preferably incorporated in the pre-treatment liquid if this liquid has to be applied by means of a jetting technique such as inkjet or valve jet. Humectants prevent the clogging of nozzles.

The pre-treatment liquid may also contain pigments. Particularly useful for printing on dark or transparent substrates, is a pre-treatment liquid containing a white pigment. The preferred pigment for the aqueous pre-treatment liquid ink is titanium dioxide. Titanium dioxide ($TiO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the pre-treatment liquid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photo-reactivity of the titanium dioxide. Metal oxide coatings of alumina, aluminasilica, boria and zirconia result in a positive charged surface of the $TiO_2$ pigments and hence are particularly useful in combination with the cationic stabilised capsules of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

In another preferred embodiment of the invention, an over-print varnish, to be applied onto a jetted aqueous inkjet ink can also comprise a compound functionalized with at least to functional groups being a primary amine or a secondary amine, a primary amine being more preferred and the dispersion of particles comprising an oligomer or polymer having at least 3 repeating units comprising a functional group according to general formula I, II or III or capsules composed of a polymeric shell surrounding a core. The core contains an oligomer or polymer having at least 3 repeating units comprising a functional group according to general formula I, II or III. The over-print varnish can be coated by any suitable coating method or printed using a printing technique such as: gravure printing, flexographic printing, offset printing or ink jet printing.

The substrate in the inkjet recording method may be porous, such as e.g. textile, paper, leather and card board substrates, but is preferably a non-absorbing substrate such as polyethylene terephthalate, polyethylene, polypropylene, polycarbonate, polyvinyl chloride, polyesters like polyethylene terephthalate (PET), polyethylene naphthalate (PEN), polylactide (PLA) or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

In another preferred inkjet recording method, the pre-treatment liquid is applied via a technique selected from the group of ink jetting, valve jetting and spraying. More specifically, these techniques of ink jetting and valve jetting allow, the pre-treatment liquid according to the invention to be applied image wise, preferably onto the surfaces whereupon the inkjet ink will be printed to obtain an image. These last means of applying the pre-treatment liquid has the advantage that the amount of required pre-treatment liquid is substantially lower than with other application methods of priming the substrate.

Examples of the heating process to dry the pre-treatment liquid, inkjet ink or over-print varnish comprising a compound functionalized with at least two functional groups being a primary amine or a secondary amine and a polymeric particle comprising an oligomer or polymer having at least 3 repeating units comprising a functional group according to general formula I, II or III, more preferably a capsule comprising a polymeric shell surrounding a core, the core comprising the oligomer or polymer having at least 3 repeating units comprising a functional group according to general formula I, II or III, include, but are not limited to, heat press, atmospheric steaming, high-pressure steaming, THERMOFIX. Any heat source can be used for the heating process; for example, an infrared ray source is employed.

The drying step can be performed at the air, but the heating step to achieve a temperature of the jetted ink, the pre-treatment liquid or over-print varnish of at least 60° C., more preferably 80° C., must be performed by using a heat source. Suitable examples of heat sources include equipment for forced-air heating, radiation heating such as IR-radiation, including NIR- and CIR radiation, conduction heating, high-frequency drying, and microwave drying.

A preferred ink jet head for the inkjet printing system to jet the inkjet ink or the pre-treatment liquid or the over-print varnish is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the ink or pre-treatment liquid according to the present invention is not restricted to piezoelectric inkjet printing. Other inkjet print heads can be used and include various types, such as a continuous type, a thermal print head type, a MEM-jet type head and a valve jet type.

EXAMPLES

Materials

All compounds are supplied by TCI Europe unless otherwise specified.

Desmodur N75 BA is a trifunctional isocyanate supplied by Bayer AG.

Lakeland ACP70 is a zwitterionic surfactant supplied by Lakeland Laboratories LTD.

Alkanol XC is an anionic surfactant supplied by Dupont.

Cab-o-Jet 465M is a magenta pigment dispersion supplied by Cabot

Amino-1 is a bifunctional amine supplied by TCI.

Example 1

The Synthesis of Inventive Resin INVRES-1

10 g 2-(acetoacetoxy)ethyl methacrylate was dissolved in 30 ml ethyl acetate. 0.472 g dodecyl mercaptane was added and the mixture was purged with nitrogen. 134 mg 2,2'-azobis[2-methylbutyronitrile] was added and the mixture was refluxed for 6 hours. The mixture was allowed to cool down to room temperature. The solution of inventive resin INVRES-1 in ethylacetate was directly used in the synthesis of inventive capsule INVCAP-1.

The molecular weight of INVRES-1 was determined, using GPC relative to poly(styrene) standards. INVRES-1 had a numeric weight average molecular weight Mn of 10500 and a weight average molecular weight Mw of 15400.

The Preparation of Inventive Capsule INVCAP-1:

13.2 g of Desmodur N75 BA was added to 37 g of the above described solution of INVRES-1 in ethyl acetate. 1.2 g of Lakeland ACP 70 was added and the solution was stirred for an hour at room temperature.

This solution was added to a solution of 3.36 g Lakeland ACP 70, 1.17 g lysine and 1.5 g triethanol amine in 44 g water, while stirring with an Ultra Turrax at a rotation speed 16000 rpm for 5 minutes. 52 g water was added and the solvent evaporated at 60° C. under reduced pressure, while gradually increasing the vacuum from 500 mbar to 120 mbar. The weight of the dispersion was adjusted to 88 g by evaporating water at 120 mbar. The dispersion was stirred for 16 hours at 65° C. The dispersion was allowed to cool down to room temperature and the dispersion was filtered over a 1.6 μm filter.

The average particle size was measured using a Zetasizer™ Nano-S (Malvern Instruments, Goffin Meyvis). The average particle size was 183 nm.

Preparation of Comparative Ink COMP-1 and Inventive Ink INV-1

Inventive ink INV-1 and comparative ink COMP-1 were prepared by mixing the components according to Table 5. All weight percentages are based on the total weight of the ink jet ink.

TABLE 5

| Mass (wt. %) | COMP-1 | INV-1 |
|---|---|---|
| INVCAP-1 | 5 | 5 |
| Cab-O-Jet 465M | 2 | 2 |
| Water | 5 | 5 |
| Alkanol XC | 0.1 | 0.1 |
| Amino-1 | — | 0.144 |

The inventive composition INV-1 and comparative composition COMP-1 were coated on glass and dried at 80° C. for 15 minutes. The solvent resistance was tested by wiping 40 times with a Q-tip over the coatings using isopropanol and methyl ethyl ketone as solvent.

The coating of the comparative composition COMP-1 was clearly damaged while the coating of the inventive composition INV-1 was fully resistant against both solvents, proving the crosslinking of the coating at 80° C.

Example 2

Example 2 demonstrates that the storage stability of the ink according to the invention is sufficient for practical use.

The inventive ink INV-2 was prepared by mixing the components according to Table 6. All weight percentages are based on the total weight of the ink jet ink.

TABLE 6

| Weight % of | INV-2 |
|---|---|
| INVCAP-1 | 38 |
| Cab-O-Jet 465M | 23.5 |
| Alkanol XC | 0.5 |
| Amino-1 | 1 |
| Propylene glycol | 18 |
| Glycerol | 18 |
| N-methyl-diethanol amine | 1 |

Inventive ink INV-2 was stored at 60° C. for 14 days and the change in viscosity was monitored. The starting viscosity was 7.5 mPas. Upon aging the viscosity change was less than 10% of the original value showing that the combination of the compound functionalized with at least two functional groups selected from the group consisting of a primary amine and a secondary amine, a colorant and a polymeric particle comprising an oligomer or polymer having at least 3 repeating units comprising a functional group according to general formula I, II or III is sufficiently stable for practical use.

The invention claimed is:

1. An aqueous inkjet ink comprising a compound functionalized with at least two functional groups selected from the group consisting of a primary amine and a secondary amine, a colorant, and a polymeric particle comprising an oligomer or polymer having at least 3 repeating units comprising a functional group according to Formula I, II, or III:

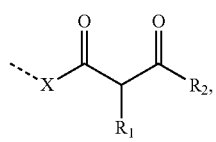

Formula I

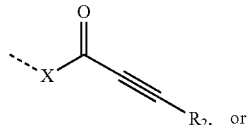

Formula II

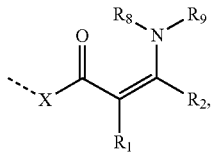

Formula III wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $COR_3$, and CN;

$R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, and $COR_3$, or $R_1$ and $R_2$ may represent the necessary atoms to form a five to eight membered ring;

$R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$, and $NR_5R_6$;

$R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

$R_5$ and $R_6$ are each independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_5$ and $R_6$ may represent the necessary atoms to form a five to eight membered ring;

X is selected from the group consisting of O and $NR_7$;

$R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group; and $R_8$ and $R_9$ are each independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_8$ and $R_9$ may represent the necessary atoms to form a five to eight membered ring.

2. The aqueous inkjet ink of claim 1, wherein the polymeric particle is a capsule, the capsule comprising a polymeric shell surrounding a core, the core comprising the oligomer or polymer having at least 3 repeating units comprising a functional group according to Formula I, II, or III.

3. The aqueous inkjet ink of claim 2, wherein the polymeric shell comprises a poly(urea), a (poly)urethane, or a combination thereof.

4. The aqueous inkjet ink of claim 1, wherein the compound is a resin particle, functionalized with at least 5 functional groups selected from the group consisting of a primary amine and a secondary amine.

5. The aqueous inkjet ink of claim 2, wherein the compound is a resin particle, functionalized with at least 5 functional groups selected from the group consisting of a primary amine and a secondary amine.

6. The aqueous inkjet ink of claim 1, wherein the oligomer or polymer comprises at least 15 repeating units.

7. The aqueous inkjet ink of claim 2, wherein the oligomer or polymer comprises at least 15 repeating units.

8. The aqueous inkjet ink of claim 1, wherein the compound is di- or trifunctional.

9. The aqueous inkjet ink of claim 2, wherein a dispersing group is covalently bonded to the polymeric shell.

10. The aqueous inkjet ink of claim 9, wherein the dispersing group is selected from the group consisting of a carboxylic acid or salt thereof, a sulfonic acid or salt thereof, a phosphoric acid ester or a salt thereof, and a phosphonic acid or salt thereof.

11. The aqueous inkjet ink of claim 1, wherein the colorant is a pigment.

12. The aqueous inkjet ink of claim 2, wherein the colorant is a pigment.

13. An inkjet recording method comprising the steps of:
a) jetting an inkjet ink as defined in claim 1 on a substrate; and
b) drying the jetted inkjet ink by applying heat to obtain a temperature of the jetted ink of at least 60° C.

14. An inkjet recording method comprising the steps of:
a) jetting an inkjet ink as defined in claim 2 on a substrate; and
b) drying the jetted inkjet ink by applying heat to obtain a temperature of the jetted ink of at least 60° C.

15. The inkjet recording method of claim 13, further comprising the step of applying, before step a), an aqueous pre-treatment liquid on the substrate, the pre-treatment liquid comprises a compound capable of aggregating components in the aqueous inkjet ink.

16. The inkjet recording method of claim 14, further comprising the step of applying, before step a), an aqueous pre-treatment liquid on the substrate, the pre-treatment liquid comprises a compound capable of aggregating components in the aqueous inkjet ink.

17. The inkjet recording method of claim 15, wherein the pre-treatment liquid is applied via a technique selected from the group of ink jetting, valve jetting and spraying.

18. The inkjet recording method of claim 16, wherein the pre-treatment liquid is applied via a technique selected from the group of ink jetting, valve jetting and spraying.

* * * * *